Figure 1:
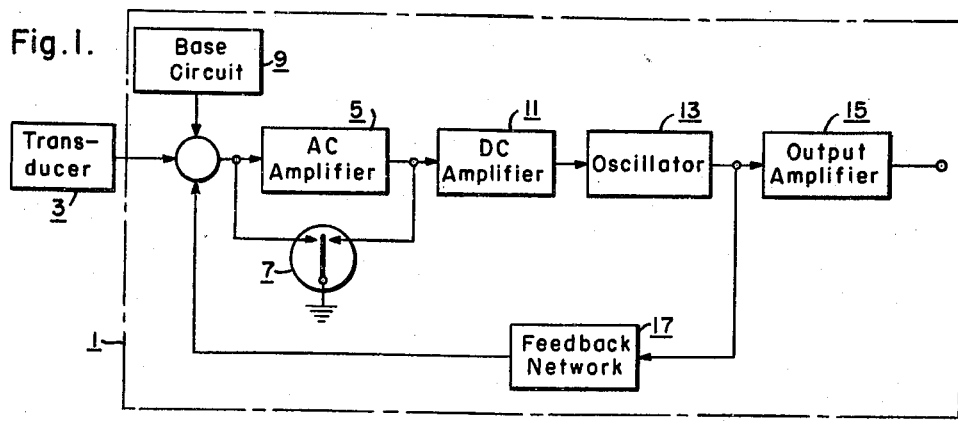

Aug. 18, 1959     T. BARABUTES ET AL     2,900,607

REMOTE METERING APPARATUS

Filed Feb. 27, 1958

United States Patent Office 2,900,607
Patented Aug. 18, 1959

2,900,607

REMOTE METERING APPARATUS

Theodore Barabutes, Morristown, and Andrew Kulick, Jr., Passaic, N.J., assignors to Westinghouse Electric Corporation, East Pittsburgh, Pa., a corporation of Pennsylvania Application February 27, 1958, Serial No. 717,901

10 Claims. (Cl. 332—16)

This invention relates to remote metering apparatus and has particular relation to devices for transmitting intelligence to remote metering stations.

According to the present invention a telemetering transmitter of improved construction is provided for deriving from a variable direct voltage input an alternating voltage output having a frequency proportional to the magnitude of the input voltage. The direction of deviation of the frequency of the alternating output from a base frequency is dependent upon the polarity of the input voltage.

A transmitter constructed in accordance with the invention includes an alternating current amplifier with means effective to supply to the amplifier an alternating voltage modulated in accordance with the direct voltage input. The modulating means also serves at the same time to demodulate the amplified alternating voltage. A direct current amplifier is provided to amplify the demodulated voltage wtih the amplified demodulated voltage being supplied to an oscillator to control the frequency of oscillations. The resulting oscillations are amplified to produce output oscillations which may be applied to a suitable telemetering circuit.

In the present invention the transmitter includes feedback means for supplying to the modulating means a feedback voltage which is derived from the output of the oscillator. The feedback means is arranged to supply a direct current feedback voltage having a magnitude proportional to the frequency of the oscillations.

The invention further provides a base circuit for providing a base output frequency for a zero value of the direct voltage input. To this end the base circuit provides a direct voltage which is applied to the modulating means in series relation with the direct voltage input. The arrangement is such that the direction of deviation of the frequency of the alternating output from the base frequency is dependent upon the polarity of the direct input voltage. The resultant signal applied to the modulating means is the algebraic sum of the base, input and feedback voltages. This resultant signal is termed an error signal and is the signal which modulates an alternating voltage for application to the alternating current amplifier.

In a preferred embodiment of the invention the modulating and demodulating means are in the form of a synchronous chopper having a contact movable between a pair of fixed contacts at a preselected frequency. The fixed contacts are connected respectively to the input and output of the alternating current amplifier. Operation of the chopper results in the provision of an alternating voltage which is modulated according to the direct input voltage, and also in the demodulation of the amplified alternating voltage.

The feedback means preferably includes saturable magnetic core means which is magnetized in accordance with the output oscillations of the oscillator. The arrangement is such that the core means is driven between opposing levels of saturation each half cycle of the oscillator frequency to provide an alternating voltage quantity consisting of a series of spaced pulses of constant volt-second area. Suitable rectifier means are connected to provide a series of spaced unidirectional pulses when energized in accordance with the alternating voltage having an average magnitude proportional to the oscillator frequency.

It is therefore an object of the invention to provide a telemetering transmitter of improved construction for deriving an alternating output voltage which is a function of a direct input voltage.

It is another object of the invention to provide a telemetering transmitter for deriving an alternating output voltage having a frequency proportional to the magnitude of a direct input voltage which includes an alternating current amplifier with a device for effecting both the modulation of an alternating voltage according to a direct voltage input and the demodulation of the amplified alternating voltage.

It is a further object of the invention to provide a telemetering transmitter for deriving an alternating voltage output having a frequency proportional to the magnitude of a direct input voltage including an oscillator having a frequency controlled in accordance with the output of a chopper amplifier with a feedback network for delivering a direct feedback voltage to the chopper amplifier derived from the output of the oscillator.

It is still another object of the invention to provide a telemetering transmitter as described in the preceding paragraph wherein the feedback network includes saturable magnetic core means responsive to oscillations from the oscillator.

Figure 2:
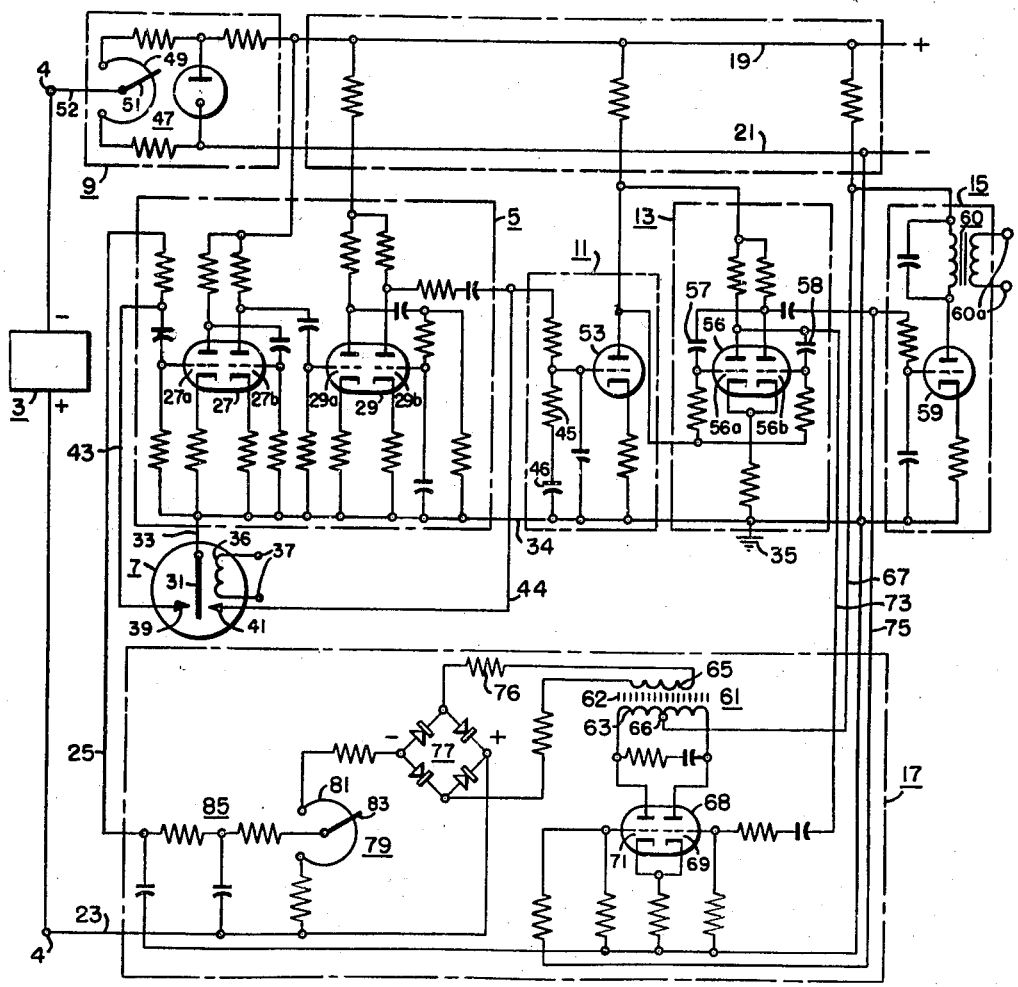

Other objects of the invention will become apparent from the following description taken in conjunction with the accompanying drawings, in which:

Figure 1 is a block diagram of a telemetering transmitter constructed in accordance with the present invention; and Fig. 2 is a circuit diagram of the transmitter illustrated in Fig. 1.

Referring to the drawings there is illustrated in Fig. 1 a telemetering transmitter constructed in accordance with the present invention. The transmitter is represented generally by the broken line rectangle 1 and includes several components represented in Fig. 1 in block form.

The transmitter 1 may be utilized in connection with a suitable transducer represented generally by the block 3. The transducer 3 may be of any suitable type which produces a voltage output representative of a measured quantity such as voltage, current, power, temperature, etc. For example, the transducer 3 may be of the thermocouple wattmeter type which produces a direct millivolt output representative of power of an electrical circuit.

As shown in Fig. 1 the transmitter 1 includes an alternating current amplifier 5 which is employed to amplify a modulated signal produced by operation of a suitable modulator 7. In order to provide a base frequency for a zero value of the direct input voltage derived from the transducer 3 there is provided a base circuit 9 for producing a direct voltage which is applied to the modulator 7.

As will presently appear the modulator 7 also serves to demodulate the amplified alternating output of the amplifier 5. The resulting demodulated output of the amplifier 5 is applied to a direct current amplifier 11 for producing an amplified direct voltage which is proportional to the voltage output of the transducer 3.

A suitable variable frequency oscillator 13 is provided which is responsive to the direct voltage output of the amplifier 11. The arrangement is such that the resulting oscillations have a frequency which is proportional to the magnitude of the output of the amplifier 11. The oscillations derived from the oscillator 13 are applied to an alternating current amplifier 15 for application therefrom to a suitable telemetering circuit (not shown).

As shown in Fig. 1 the transmitter 1 includes further a feedback network 17 which operates to produce a direct feedback voltage having a magnitude proportional to the frequency of oscillations of the oscillator 13. The network 17 is effective to derive the feedback voltage from the output of the oscillator 13 and to apply this voltage to the combination modulator and demodulator 7. The arrangement is such that the signal applied to the device 7 is the algebraic sum of the input, base and feedback voltages. This signal is observed to have a polarity which is dependent upon the polarity of the input voltage.

Referring now to Fig. 2 the transmitter may be energized from any suitable source of direct voltage which is represented by the conductors 19 and 21. The input voltage derived from the transducer 3 is applied to the transmitter through input terminals 4 from which current flows through a pair of conductors 23 and 25 to the device 7. The device 7 is effective to produce an alternating voltage which is modulated in accordance with the input voltage for application to the amplifier 5. Operation of the device 7 will be described hereinafter.

The amplifier 5 may be of any suitable type capable of providing an alternating output voltage which is an amplified replica of an alternating input voltage. As illustrated in Fig. 2 the amplifier 5 is of conventional type including a pair of twin triode vacuum tubes 27 and 29. The tube 27 includes triode sections 27a and 27b, and the tube 29 includes in a similar manner triode sections 29a and 29b.

The amplifier 5 illustrated is a four-stage amplifier with the section 27a constituting the first stage to which the modulated alternating voltage derived from the device 7 is applied. This voltage is amplified through the section 27a and applied to the grid electrode of the section 27b which constitutes the second stage of amplification. The section 27b effects further amplification of the modulated voltage with the amplified voltage being applied to the grid electrode of the section 29a which constitutes the third stage of amplification of the amplifier 5. The voltage derived from the section 29a is applied to the grid electrode of the section 29b constituting the fourth stage and is still further amplified to provide a greatly amplified voltage which is a replica of the modulated input voltage to the amplifier 5.

In order to effect demodulation of the output of the amplifier 5 the invention provides suitable modulating means effective to derive from the output of the amplifier 5 a direct voltage having a magnitude proportional to the input voltage from the transducer 3. According to the present invention the modulating means 7 serves also to effect demodulation of the alternating output from the amplifier 5. The construction and operation of the device 7 may now be described.

As illustrated in Fig. 2 the device 7 includes a contact or vane 31 which is connected to the negative conductor 21 through conductors 33 and 34. The conductor 34 is preferably connected to ground as indicated by the ground connection 35. In order to effect vibration of the contact 31 the device 7 includes an operating winding 36 which may be connected to a suitable source of alternating current by conductors 37. The operating winding 36 is disposed to actuate when energized the contact 31 at the energizing frequency such that the contact 31 alternately engages fixed contacts 39 and 41.

In order to provide an alternating voltage modulated by the direct voltage input from the transducer 3 the fixed contact 39 is connected to the input of the amplifier 5 by means of a conductor 43. For the purpose of effecting the demodulating function the fixed contact 41 is connected to the output circuit of the amplifier 5 by a conductor 44.

In operation when the operating winding 36 is energized, the contact 31 will be vibrated between the contacts 39 and 41 at the energizing frequency which may be, for example, 60 cycles per second. When the contact 31 engages the contact 39, a direct input voltage from the transducer 3 with the polarity indicated by the associated plus and minus signs will be grounded through the conductor 25, the conductor 43, the contact 39, the contact 31, the conductor 33, and the conductor 34. This ground connection is interrupted when the contact 31 is moved to disengage the contact 39. Such periodic diversion of the input voltage from the amplifier 5 results in the application of an alternating voltage to the tube section 27a and the resultant amplification of such voltage. The magnitude of this alternating voltage is dependent upon the magnitude of the direct input voltage with the result that the alternating voltage is modulated in accordance with the input voltage.

When the input voltage from the transducer 3 is of polarity opposite to that shown, engagement of contacts 31 and 39 is effective to divert the input voltage from the amplifier 5 through a path including conductors 21, 34 and 33, contacts 31 and 39 and conductors 43, 25 and 23.

When the contact 31 is in engagement with the fixed contact 41, the output voltage derived from the amplifier 5 is grounded through the conductor 44, the contacts 31 and 41, and the conductors 33 and 34 to the ground connection 35. Such periodic engagement of the contacts 31 and 41 is effective to provide a half-wave rectified quantity which is applied to the amplifier 11. A suitable filter network including a resistor 45 and a condenser 46 may be provided to filter out the alternating components in the rectified output whereby a substantially pure direct voltage is applied to the amplifier 11.

For the purpose of providing a predetermined base frequency for a zero value of the input voltage derived from the transducer 3 a suitable base circuit 9 is provided for developing a direct base voltage which is applied to the device 7 in series relation with the direct input voltage. For this purpose a suitable voltage divider 47 is provided including a resistance element 49 connected across the conductors 19 and 21. In order to provide a variable resistance a suitable arm 51 is disposed with an end in movable engagement with respect to the element 49. The arm 51 has its other end connected to one of the terminals 4 through a conductor 52. With this arrangement a base voltage having a desired value may conveniently be selected.

In order to effect amplification of the demodulated voltage the direct voltage amplifier 11 is provided which may be of conventional type including a triode vacuum tube 53. The demodulated voltage is applied between the grid and cathode electrodes of the tube 53 with the resultant amplified demodulated voltage appearing across the plate and cathode of the tube 53.

As illustrated in Fig. 2 the amplified demodulated voltage is applied to a variable frequency oscillator 13 which preferably constitutes a multivibrator of conventional construction. For example, the oscillator 13 may be of the well known Eccles-Jordon type. The arrangement is such that the frequency of oscillations derived from the oscillator 13 is proportional to the magnitude of the amplified demodulated voltage resulting from the amplifier 11.

The oscillator 13 may include a twin triode vacuum tube 56 having a pair of tube sections 56a and 56b. The plate electrode of the section 56b is coupled to the grid electrode of the section 56a through a condenser 57, whereas the plate of the section 56a is coupled through a condenser 58 to the grid of the section 56b. In order to control the frequency of oscillation of the oscillator 13 the amplified demodulated voltage from the amplifier 11 is applied to the grid electrode of the tube section 56a.

The resulting oscillations are preferably applied to an alternating current amplifier 15 which includes a triode vacuum tube 59. The tube 59 is effective to amplify the oscillations with the amplified oscillations being applied to a suitable transformer 60 for application to output terminals 60a of the transmitter 1.

In the present invention a feedback network 17 is provided for deriving from the output of the oscillator 13 a direct feedback voltage proportional to the frequency of such oscillations. This feedback voltage is applied to the device 7 to be balanced against the direct input voltage to the transmitter 1 such that any difference which may exist between these two direct current voltages is amplified by the amplifier 5 so as to cause further balancing of these two voltages. Inasmuch as the oscillator 13 is included in the feedback loop any frequency drift of the oscillator will be substantially compensated for.

As illustrated in Fig. 2 the network 17 includes saturable magnetic core means 61 including a magnetic core 62 preferably constructed of material exhibiting substantially rectangular hysteresis loop characteristics. A number of such magnetic materials are commercially available. For example, the magnetic core 62 may be constructed of an alloy comprising approximately equal parts of nickel and iron. The magnetic means 61 further includes input winding means 63 which link the magnetic core 62 in inductive relation with output winding means 65 also linking the core 62. The winding means 63 includes a center tap connection 66 which is connected to the positive conductor 19 through a conductor 67.

In order to control magnetization of the magnetic core 62 the invention provides control means in the form of a twin triode vacuum tube 68 having two sections 69 and 71. In the present invention the magnetic core 62 is magnetized in accordance with oscillations produced by the oscillator 13 such that an alternating voltage appears across the winding 65 consisting of a series of spaced pulses of constant volt-second area. For this purpose the magnetic core 62 is driven between opposing levels of saturation each half cycle of the frequency of oscillations of the oscillator 13.

As illustrated in Fig. 2 the plate electrode of the tube section 56a of the oscillator 13 is connected through a conductor 73 to the grid electrode of the section 69 of the tube 68. It is observed further that the plate electrode of the tube section 56b of the oscillator 13 is connected to the grid electrode of the section 71 of the tube 68 through a conductor 75. It is noted that the input winding 63 is connected between the plate electrodes of the sections 69 and 71.

In operation the tube sections 69 and 71 will conduct alternately on alternate half cycles of the oscillations produced by the oscillator 13 with the section 71 conducting during conduction of the section 56a of the oscillator 13, and with the section 69 conducting during conduction of the section 56b of the oscillator. The connections are such that when the tube section 69 is in a conducting condition the core 62 is driven between opposing saturation levels in a first direction which is opposite to the direction in which the core is driven when the tube section 71 is conducting. Such operation results in the induction of an alternating voltage across the winding 65 consisting of a series of spaced pulses of constant volt-second area.

It has been observed that the output of the feedback network 17 may vary with temperature changes to which the transmitter is subjected. Such variation is due at least in part to changes in the induction of core 62 in response to temperature changes. The core 62 possesses a negative temperature coefficient in that its induction decreases when temperature increases. In order to compensate for this the invention provides a resistance 76 in series with the winding 65 having a negative temperature coefficient. The resistance 76 may, for example, comprise a thermistor effective to maintain the output current independent of temperature.

In order to derive a series of spaced unidirectional pulses from the induced alternating voltage a suitable rectifier 77 is provided illustrated in the form of a fullwave bridge rectifier. A pair of first opposed terminals of the rectifier 77 is connected across the winding 65 for energization in accordance with the induced voltage. Such arrangement results in the production of series of spaced unidirectional pulses across the remaining pair of opposed terminals having plus and minus signs associated therewith. These unidirectional pulses have an average magnitude proportional to the frequency of oscillations of the oscillator 13.

In order to permit variation of the magnitude of the rectified voltage a suitable voltage divider 79 is provided including a resistance element 81 connected across the output terminals of the rectifier 77. The divider 79 includes an arm 83 which has an end in movable engagement with respect to the element 81 with the remaining end of the arm 83 connected to the conductor 25. The rectified voltage may be applied to a suitable filter 85 for the purpose of filtering out alternating components in the rectified voltage.

From an inspection of Fig. 2 it is observed that the direct feedback voltage is balanced against the reversible input voltage to the terminals 4 and the base voltage derived from the circuit 9. The resulting voltage which is applied to the device 7 is the algebraic sum of the input, base and feedback voltages, and is referred to as an error signal.

This error signal is modulated, amplified, demodulated, and further amplified with the result that an amplified feedback voltage is applied to the device 7. The arrangement is such that the polarity of the error signal is dependent upon the polarity of the input voltage. This results in the provision of an alternating output quantity having a frequency which deviates from the base frequency in a direction dependent upon the polarity of the input voltage.

Although the invention has been described with reference to certain specific embodiments thereof, numerous modifications are possible, and it is desired to cover all modifications falling within the spirit and scope of the invention.

We claim as our invention:

1. In an electrical system, alternating voltage amplifying means energized from a reversible direct voltage input, means effective to alternately shunt the input and output of said amplifying means to supply to said amplifying means an alternating voltage modulated in accordance with said voltage input, and to demodulate the amplified alternating voltage, an oscillator responsive to the demodulated voltage for producing oscillations having a frequency proportional to the demodulated voltage, and feedback means connected to apply a direct feedback voltage derived from the oscillator to the shunting means which is proportional to the frequency of said oscillations.

2. In an electrical system, alternating voltage amplifying means energized from a reversible direct voltage input, means effective to alternately shunt the input and output of said amplifying means to supply to said amplifying means an alternating voltage modulated in accordance with said voltage input, and to demodulate the amplified alternating voltage, an oscillator responsive to the demodulated voltage for producing oscillations having a frequency proportional to the demodulated voltage, and feedback means connected to apply a direct feedback voltage derived from the oscillator to the shunting means which is proportional to the frequency of said oscillations, said feedback means including saturable magnetic core means, input and output winding means linking the core means in inductive relation, said input winding means being connected for energization in accordance with said oscillations to transfer said core means between opposing levels of saturation each half oscillation cycle, and rectifier means connected for energization in accordance with an alternating output resulting across said output winding means to produce said direct feedback voltage.

3. In an electrical system, alternating voltage amplifying means, a synchronous chopper responsive to a reversible direct voltage input, said chopper being effective to supply to said amplifying means an alternating voltage modulated in accordance with said voltage input, said chopper being further effective to demodulate the amplified alternating voltage, circuit means connected to apply a direct bias voltage to said chopper to provide a base rate frequency for a zero value of said voltage input, an oscillator responsive to the demodulated voltage for producing oscillations having a frequency proportional to the demodulated voltage, and feedback means connected to apply a direct feedback voltage derived from the oscillator to the synchronous chopper which is proportional to the frequency of said oscillations.

4. In an electrical system, alternating voltage amplifying means, a vibrator relay responsive to a direct voltage input, said relay including a vibrator, an operating winding, and a pair of contacts in the path of the vibrator; each of said contacts being connected to a separate one of the input and output of said amplifying means, said operating winding being effective when energized in accordance with an alternating energizing voltage to operate the vibrator between the contacts at the energizing voltage frequency, said vibrator being effective when operated to supply to said amplifier input an alternating voltage modulated in accordance with said voltage input, and to demodulate the amplified alternating voltage, an oscillator responsive to the demodulated voltage for producing oscillations having a frequency proportional to the demodulated voltage, and feedback means connected to apply a direct feedback voltage derived from the oscillator to the synchronous chopper which is proportional to the frequency of said oscillations.

5. In a telemetering transmitter, alternating voltage amplifying means, a vibrator relay responsive to a direct voltage input, said relay including a vibrator, an operating winding, and a pair of contacts in the path of the vibrator; each of said contacts being connected to a separate one of the input and output of said amplifying means, said operating winding being effective when energized in accordance with an alternating energizing voltage to operate the vibrator between the contacts at the energizing voltage frequency, said vibrator being effective when operated to supply to said amplifier input an alternating voltage modulated in accordance with said voltage input, and to demodulate the amplified alternating voltage, an oscillator responsive to the demodulated voltage for producing oscillations having a frequency proportional to the demodulated voltage, and feedback means connected to apply a direct feedback voltage derived from the oscillator to the synchronous chopper which is proportional to the frequency of said oscillations, said feedback means including saturable magnetic core means constructed of material exhibiting substantially rectangular hysteresis loop characteristics, input and output winding means linking the core means in inductive relation, said input winding means being connected for energization in accordance with said oscillations to transfer said core means between opposing levels of saturation each half oscillation cycle, and rectifier means connected for energization in accordance with an alternating output resulting across said output winding means to produce said direct feedback voltage.

6. In a telemetering transmitter, alternating voltage amplifying means, a vibrator relay responsive to a direct voltage input, said relay including a vibrator, an operating winding, and a pair of contacts in the path of the vibrator; each of said contacts being connected to a separate one of the input and output of said amplifying means, said operating winding being effective when energized in accordance with an alternating energizing voltage to operate the vibrator between the contacts at the energizing voltage frequency, said vibrator being effective when operated to supply said amplifier input an alternating voltage modulated in accordance with said voltage input, and to demodulate the amplified alternating voltage, circuit means connected to apply a direct bias voltage to said vibrator relay to provide a base rate frequency for a zero value of said voltage input, an oscillator responsive to the demodulated voltage for producing oscillations having a frequency proportional to the demodulated voltage, and feedback means connected to apply a direct feedback voltage derived from the oscillator to the vibrator relay which is proportional to the frequency of said oscillations, said feedback means including saturable magnetic core means constructed of material exhibiting substantially rectangular hysteresis loop characteristics, input and output winding means linking the core means in inductive relation, said input winding means being connected for energization in accordance with said oscillations to transfer said core means between opposing levels of saturation each half oscillation cycle, and rectifier means connected for energization in accordance with an alternating output resulting across said output winding means to produce said direct feedback voltage.

7. In a telemetering transmitter, alternating voltage amplifying means, a vibrator relay responsive to a direct voltage input, said relay including a vibrator, an operating winding, and a pair of contacts in the path of the vibrator; each of said contacts being connected to a separate one of the input and output of said amplifying means, said operating winding being effective when energized in accordance with an alternating energizing voltage to operate the vibrator between the contacts at the energizing voltage frequency, said vibrator being effective when operated to supply to said amplifier input an alternating voltage modulated in accordance with said voltage input, and to demodulate the amplified alternating voltage, circuit means connected to apply a direct bias voltage to said vibrator relay to provide a base rate frequency for a zero value of said voltage input, a direct voltage amplifier connected to amplify the demodulated voltage, an oscillator responsive to the amplified demodulated voltage for producing oscillations having a frequency proportional to the demodulated voltage, and feedback means connected to apply a direct feedback voltage derived from the oscillator to the vibrator relay which is proportional to the frequency of said oscillations, said feedback means including saturable magnetic core means constructed of material exhibiting substantially rectangular hysteresis loop characteristics, input and output winding means linking the core means in inductive relation, said input winding means being connected for energization in accordance with said oscillations to transfer said core means between opposing levels of saturation each half oscillation cycle, and rectifier means connected for energization in accordance with an alternating output resulting across said output winding means to produce said direct feedback voltage.

8. In a telemetering transmitter, alternating voltage amplifying means, a synchronous chopper responsive to a reversible direct voltage input, said chopper being effective to supply to said amplifying means an alternating voltage modulated in accordance with said voltage input, said chopper being further effective to demodulate the amplified alternating voltage, direct voltage amplifying means connected to amplify said demodulated voltage, a multivibrator including a pair of electronic valves each having a control electrode and a pair of other electrodes, corresponding ones of said other electrodes and said control electrodes being cross-coupled to provide an oscillator, said corresponding electrodes being connected for energization in accordance with said amplified demodulated voltage to provide oscillations having a frequency proportional to said amplified demodulated voltage, and feedback means connected to apply a direct feedback voltage derived from the oscillator to the synchronous chopper which is proportional to the frequency of said oscillations.

9. In a telemetering transmitter, alternating voltage amplifying means, a synchronous chopper responsive to a reversible direct voltage input, said chopper being effective to supply to said amplifying means an alternating voltage modulated in accordance with said voltage input, said chopper being further effective to demodulate the amplified alternating voltage, direct voltage amplifying means connected to amplify said demodulated voltage, a multivibrator including a pair of first electronic valves each having a first control electrode and a pair of first other electrodes, corresponding ones of said first other electrodes and said first control electrodes being cross-coupled to provide an oscillator, said corresponding electrodes being connected for energization in accordance with said amplified demodulated voltage to provide oscillations having a frequency proportional to said amplified demodulated voltage, and feedback means connected to apply a direct feedback voltage derived from the oscillator to the synchronous chopper which is proportional to the frequency of said oscillations, said feedback means including a pair of second electronic valves each having a second control electrode and a pair of second other electrodes, each of said corresponding electrodes being connected to a separate one of said second control electrodes, saturable magnetic core means constructed of material exhibiting substantially rectangular hysteresis loop characteristics, input and output winding means linking the core means in inductive relation, said input winding means having a pair of winding sections each connected for energization through a separate one of said second valves to transfer said core means between opposing levels of saturation each half oscillation cycle, and rectifier means connected for energization in accordance with an alternating output resulting across said output winding means to produce said direct feedback voltage.

10. In a telemetering transmitter, alternating voltage amplifying means, means effective to supply to said amplifying means an alternating voltage modulated in accordance with a reversible direct voltage input, and to demodulate the amplified alternating voltage, an oscillator responsive to the demodulated voltage for producing oscillations having a frequency proportional to the demodulated voltage, and feedback means connected to apply a direct feedback voltage derived from the oscillator to said first-named means which is proportional to the frequency of said oscillations, said feedback means including saturable magnetic core means constructed of material exhibiting substantially rectangular hysteresis loop characteristics, input and output winding means linking the core means in inductive relation, said input winding means being connected for energization in accordance with said oscillations to transfer said core means between opposing levels of saturation each half oscillation cycle, and rectifier means connected for energization in accordance with an alternating output resulting across said output winding means to produce said direct feedback voltage.

References Cited in the file of this patent

UNITED STATES PATENTS

| | | |
|---|---|---|
| 2,362,898 | Gilman | Nov. 14, 1944 |
| 2,438,950 | Smith | Apr. 6, 1948 |